United States Patent

[11] 3,582,948

| [72] | Inventor | Edward B. Mitchell |
| | | Belmont, Mass. |
| [21] | Appl. No. | 810,578 |
| [22] | Filed | Mar. 26, 1969 |
| [45] | Patented | June 1, 1971 |
| [73] | Assignee | United-Carr Incorporated |
| | | Boston, Mass. |

[54] FLUSH MOUNT INDICATOR HOUSING WITH FLEXIBLE TONGUE
1 Claim, 6 Drawing Figs.

| [52] | U.S. Cl. | 340/381, 340/366 |
| [51] | Int. Cl. | G08b 5/36 |
| [50] | Field of Search | 340/381 |

[56] References Cited
UNITED STATES PATENTS

| 2,221,078 | 11/1940 | Dotterer | 340/381 |
| 2,742,636 | 4/1956 | Alden | 340/381 |
| 3,329,951 | 7/1967 | Ryan | 340/381 |

*Primary Examiner*—Harold I. Pitts
*Attorneys*—Philip E. Parker, Gordon Needleman, James R. O'Connor, John Todd, Hall and Houghton and J. Y. Houghton

ABSTRACT: This invention is directed at an indicator housing having a flexible forklike member with a keyhole slot formed therein adapted to encase a lens member placing the forklike member under flexure.

PATENTED JUN 1 1971

3,582,948

INVENTOR
EDWARD B. MITCHELL
BY
Gordon Needleman,
ATTORNEY

FLUSH MOUNT INDICATOR HOUSING WITH FLEXIBLE TONGUE

BACKGROUND OF THE INVENTION

There are several known methods of engaging a lens member to the housing of an indicator and an apertured support.

An early method is disclosed in the U.S. Pat. to Dotterer, No. 2,221,078, which uses a metal indicator assembly having a keyway through which the lens engages, after having its shank passed through an aperture formed in the support. In this case, the socket was of the bayonet slot type and the mounting bracket included a pair of sidewalls 36 which were connected by a plate in which the keyholed slot was formed. The amount of flexibility in the plate was extremely small.

In the U.S. Pat. to Fraser, No. 3,060,401, a pair of extended arms 30 were used to engage the keyhole slot which was formed in the support. The arms in this case adapted to flex toward each other, provide the necessary addition for holding the indicator securely to the support. This device did not have a keyhole slot and did not provide any take up between the terminal ends 34 of the arms 30 and the face 32 of the indicator.

The U.S. Pat. to Ryan, No. 3,329,951, does utilize an open keyholed slot. Adjustability and tension between the indicator and the support is supplied by a pair of arms 32, one of which extends from each sidewall of the indicator. The base portion 28 of the indicator has the keyhole slot formed therein on a single plan.

SUMMARY OF THE INVENTION

An object of the present invention is to provide a flexible forklike retaining tongue formed to provide flat surfaces adapted to abut in parallel relation a support surface.

Another object of the present invention is to provide an indicator housing having integral fastener means.

A still further object of the invention is to provide a one-piece indicator housing adapted for parallel attachment to a lens member and an apertured support.

DESCRIPTION OF THE PREFERRED EMBODIMENT

Figure 1:
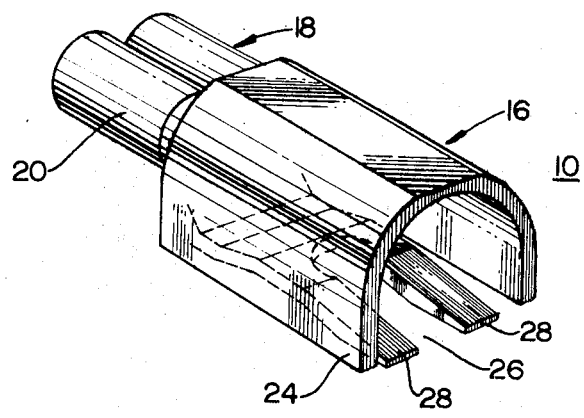
FIG. 1 is a perspective of an indicator housing showing the retaining tongue partly in phantom.
Figure 2:
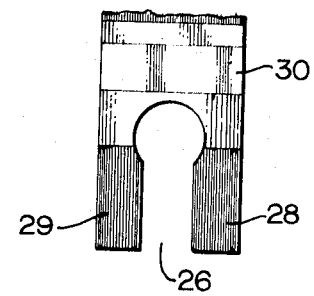
FIG. 2 is a top plan view of the retaining tongue of the housing shown in FIG. 1.
Figure 3:
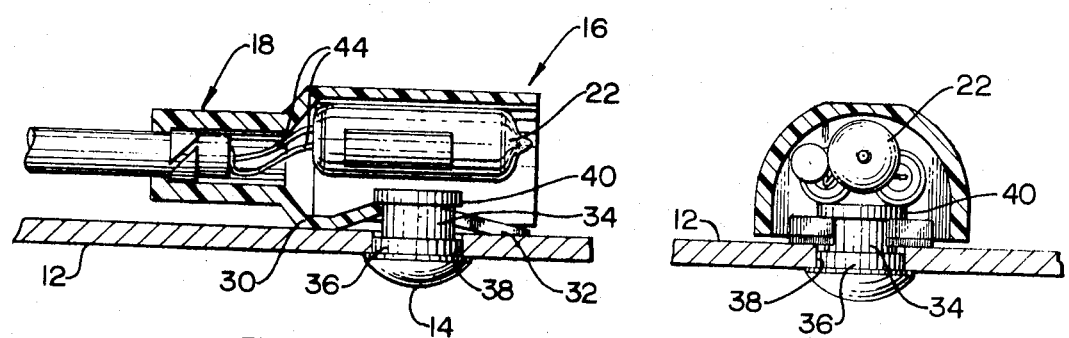
FIG. 3 is a section of the housing shown in FIG. 1 engaged with a support shown in section and a lens and harness shown in side elevation.

In the drawing, there is shown a flush mount indicator assembly, including a housing 10 formed of an insulating material such as nylon, an apertured support member 12 and a lens member 14.

The housing 10 comprises a bulb retaining portion 16 and a leader retaining and separating portion 18 from which the bulb retainer portion 16 extends.

The leader retaining and separating portion 18 includes two tubular portions 20 in a side-by-side abutting relationship providing a common wall portion. One of the tubular portions 20 may be made longer than the other to avoid the necessity of bending either of the conductor leads of the bulb 22.

Figure 4:
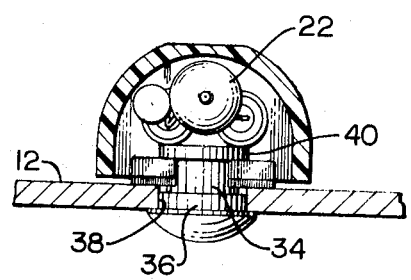
FIG. 4 is another section of the housing showing the assembly of FIG. 3 in end view.

The bulb retaining portion 16 comprises a canopy portion and a retaining tongue spaced from the canopy portion. The canopy portion includes a pair of spaced, arced sidewalls 24, connected on one side edge by an upper portion whose external surface is flattened. The area defined by the external surface of the canopy portion is greater than the area encompassed by the leader retaining and separating portion 18. The internal surface of the canopy portion describes a continuous arc as shown in FIGS. 1 and 4.

The retaining tongue comprises a support portion having a slotted keyway 26 formed therein which is open at the terminal end of the retaining tongue and which provides a pair of spaced arms 28. The retaining tongue is angled downwardly from its connection with the leader retaining and separating portion, then is bent to form a first flat 30 which lies on a plane parallel to the axis of the housing 10, then is angled upwardly to terminate in a second flat which is parallel with the first flat 30, and then continues downwardly at an acute angle to the terminal end of each arm 28, which is chamfered to form a contact portion 32.

The lens member 14 has a shallow, arced optical portion and a tubular shank extending therefrom. The tubular shank 34 has on its outer surface a circumferential collar 36 adjacent the optical portion forming a shoulder therewith. The optical portion has maximum diameter greater than the shank 34 or the circumferential collar 36. The circumferential collar 36 provides a means of centering the lens member 14 in an aperture 38 formed in the support 12, as well as preventing transverse movement therein. A second circumferential collar 40 is formed adjacent the open end of the shank 34 remote from the optical portion, providing a second shoulder with the shank 34 parallel to that formed by the first circumferential collar 36. The second circumferential collar 40 is tapered on its external surface toward the open end of the shank 34 to provide a facet surface to exist in concentrating the light emanating from the bulb 22.

The harness has a bulb 22 with a pair of bulb conductor leads 44 extending therefrom. One of the bulb conductor leads 44 may have a resistor engaged therewith and a lead from that resistor and the other bulb conductor lead can each be engaged to separate insulated wires.

To engage the harness with the housing 10, the insulated wires are passed between the canopy portion and the retaining tongue and into the lead retaining and separating portion 18 with the lead which includes the resistor's being passed into the other tubular portion 20, thereby positioning the bulb 22 over the slotted keyway 26.

The assembly of the housing 10 and the harness is engaged with the apertured support member 12 and the lens member 14 in the following manner. The aperture 38 of the support member 12 has a diameter less than the optical portion, but slightly greater than the circumferential collar 36 of the lens member 14. The lens member 14 is passed into the aperture 38 placing a part of the optical portion into abutting relationship with the surface of the support member 12 adjacent the aperture 38 and placing the wall of the aperture 38 into circumscribed abutting relationship with the external surface of the circumferential collar 36.

The assembled housing and harness is engaged to the assembled support member and lens member by sliding the housing 10 with the contact portions 32 of the retaining tongue butted against the rear surface of the support member 12 against the lens member 14 so that the arms 28 pass on each side of the tubular shank 34 until the second circumferential collar 40 is placed in a superimposed abutting relationship with the second flat of the arms 28. The arms 28 are flexed outwardly on a plane parallel to the plane of the support member 12 until the shank 34 engages in the circular part of the keyway 26 at which time the arms 28 snap back locking the lens member in engagement. This engagement may also take place along the upper surface of the last downward turning of the arms 28. Due to the fact that the distance between the rear surface of the support member 12 and the second circumferential collar 40 is less than the distance between the planes of the second flat and the plane of the contact portions 32, the arms 28 are flexed toward the support member 12 and kept under tension. The flexure of the arms 28 insures a tight engagement between the lens member 14 and the associated support member 12 and the housing 10.

Figure 5:
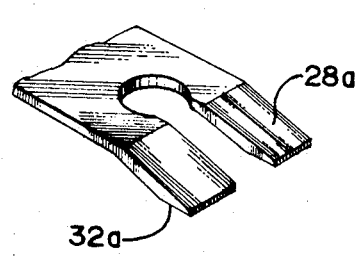
FIG. 5 is a perspective of the variation of the retaining tongue.

A variation of the retaining tongue is shown in FIG. 5 of the drawing. This variation does not have the first flat 30 as shown in FIGS. 1 through 4 but instead provides only an upper flat and then the two arms 28a which are bent downwardly from the flat and terminate in free ends which have flat contact portions 32a. In this case, a rib or projection would be provided extending from the leader retaining and separating portion 18 to provide a surface which will abut a support simultaneously with the engagement of the contact portions 32a. On engagement with a lens member, the arms 28a would be flexed on a plane parallel with the support while the flat would be displaced towards the support, thus placing the retaining tongue under flexure.

Figure 6:
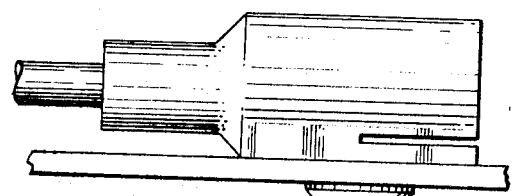
FIG. 6 is a side elevation of another variation of the indicator housing.

The variation in turn may be slightly varied as shown in FIG. 6 by having the downward bend of extremely small degree and by having the platform portion to the rear of the two arms 28a integral with the remaining housing so that only the arms 28a are spaced from the housing.

I claim:

1. A combination of a housing for an electrical bulb, an apertured support and a lens member, the housing including a retaining tongue having at least two arms spaced from each other to define a keyhole slot, the two arms providing a flat portion in parallel relationship to the longitudinal plane of the housing and having their terminal ends angled downwardly, the keyhole slot having a straight and a semicircular portion, the straight portion having a width less than that of the diameter of the semicircular portion, the lens member having a shank portion and a circumferential collar, the shank portion having a diameter greater than the straight portion of the keyhole slot and less than the diameter of the semicircular portion, the circumferential collar having a diameter greater than the diameter of the semicircular portion and the lens member having a head portion spaced from the circumferential collar and having a diameter greater than the diameter of the aperture in the support, the head portion of the lens member is engaged against one side of the apertured support adjacent the aperture, a portion of the shank is within the aperture, the circumferential collar is engaged on the surface of the retaining tongue adjacent the semicircular portion and the terminal ends of the arms are butted against the other side of the apertured support from that engaged by the head portion.